(12) United States Patent
Wills

(10) Patent No.: US 6,509,051 B1
(45) Date of Patent: Jan. 21, 2003

(54) PROCESS FOR REMOVING RESIDUAL SOLVENT FROM SOLIDS

(75) Inventor: Robert A. Wills, Brooklyn Park, MN (US)

(73) Assignee: Crown Iron Works Company, Roseville, MN (US)

( * ) Notice: Subject to any disclaimer, the term of this patent is extended or adjusted under 35 U.S.C. 154(b) by 0 days.

(21) Appl. No.: 09/518,337

(22) Filed: Mar. 3, 2000

(51) Int. Cl.⁷ .............................. A23L 1/20; A23L 1/28
(52) U.S. Cl. .................. 426/425; 426/489; 426/492; 426/634
(58) Field of Search .................. 426/425, 489, 426/442, 634

(56) References Cited

U.S. PATENT DOCUMENTS 3,966,981 A * 6/1976 Schultz
4,496,599 A   1/1985 Steinkraus .................. 426/430

* cited by examiner

Primary Examiner—Anthony J. Weier
(74) Attorney, Agent, or Firm—Nawrocki, Rooney & Sivertson, P.A.

(57) ABSTRACT

A process for removing residual amounts of a first solvent from a granular material. The process includes the selection of a second solvent which has an ambient pressure boiling point lower than that of the first solvent in mixing the second solvent with the granular material and first solvent. Most of the liquid solvent mixture is removed from the granular material using a simple solid/liquid extraction process. The remaining solvent mixture, which primarily is the second solvent, is removed from the granular material using a thermal and/or vacuum process.

5 Claims, 1 Drawing Sheet

PROCESS FOR REMOVING RESIDUAL SOLVENT FROM SOLIDS

FIELD OF THE INVENTION

The present invention relates generally to methods and apparatus for desolventizing solids; and more particularly to a process for removing residual solvent from a solid such as soybean meal.

BACKGROUND OF THE INVENTION

Organic solvents such as hexane, heptane, alcohols and the like are commonly used for treating or processing solids, to extract a useful material from the solid and/or to cause a desired change in that solid. For example, organic solvents (e.g., hexane) are used to extract oil and fat from oilseed such as soybean. The typical soybean oil-extraction process has many steps, including cleaning, cracking, conditioning, expelling and solvent extraction, resulting in a solid (i.e., oil-depleted meal) and a liquid (i.e., oil). The oil can then be further refined and processed to make such things as margarine and shortening; various deodorized products; and various physically refined products. The oilseed meal, on the other hand, can be used for such things as animal feed. But in order to do so, it must have its residual solvent removed. After extracting oil and/or fat from the soybeans a quantity of the hexane remains entrained or entrapped within the solid particles, and in order to make maximum use of the oil-depleted solid particles it is important to remove as much of the residual solvent as possible. Before the deoiled (or defatted) spent meal can be used as cattle or chicken feed it must first have the residual n-hexane (typical) removed.

The traditional method for removing the solvent from the spent soy is to heat the solids under a slight vacuum and allow the solvent to boil from the solids. This is called desolventizing or desolventizing-toasting (DT). While these traditional methods for removing the residual solvent from the oilseed meal are sometimes satisfactory, it is often desirable to remove even more of the residual solvent.

A DT may be used to remove a good portion of the solvent, but often residual solvent remains. Inside the extractor the materials undergo a separation process where the solids are separated from the liquids. And then the solids may be processed by a DT. But in either case, it is common for there to be some solvent remaining entrapped or entrained by or in the solid particles. The present invention relates to a process for removing residual solvent from a solid such as an oilseed meal that has advantages over the traditional methods in many cases. For example, the present process can strip more residual solvent than traditional methods, and do so in such a way that is often more energy efficient and less damaging to the solid.

SUMMARY OF THE INVENTION

The present invention is a process for removing residual amounts of a first solvent from a granular material. The process applies to solvent removal wherein the first solvent has a first ambient pressure boiling point. The process includes a first step of selecting a second solvent, having a second ambient pressure boiling point, that is lower than the first ambient pressure boiling point and mixing the second solvent with the granular material and first solvent. Most of the liquid solvent mixture is then removed from the granular material using a simple solid/liquid extraction process. Finally, the remaining solvent mixture, which is primarily made up of the second solvent, is removed from the granular material using a thermal and/or vacuum process. This serves to leave a highly desolventized granular material.

In a preferred manner of performing the process, the liquid solvent mixture removed from the granular material by use of a simple solid/liquid extraction process is then distilled in order to recover liquid original solvent and a gaseous second solvent. Such recovered gaseous products can then be compressed and chilled to form a liquid second solvent. If desired, such a liquid product can be returned to the mixer.

The process in accordance with the present invention is particularly efficacious for removing solvent from organic materials such as seeds, berries and leaf particles. It also serves well to remove solvent from inorganic or inert solids such as silica sand. Further, the solids may be granular or thin plates or a woven material forming a web or a combination thereof.

The present invention is thus an improved process for solvent removal from granular materials. More specific features of the invention and advantages obtained in view of those features will become apparent with reference to the DETAILED DESCRIPTION OF THE INVENTION, appended claims, and accompanying drawing.

BRIEF DESCRIPTION OF THE DRAWINGS

The invention will be further described with reference to the appended Drawing, in which.

DETAILED DESCRIPTION OF THE INVENTION

Figure 1:
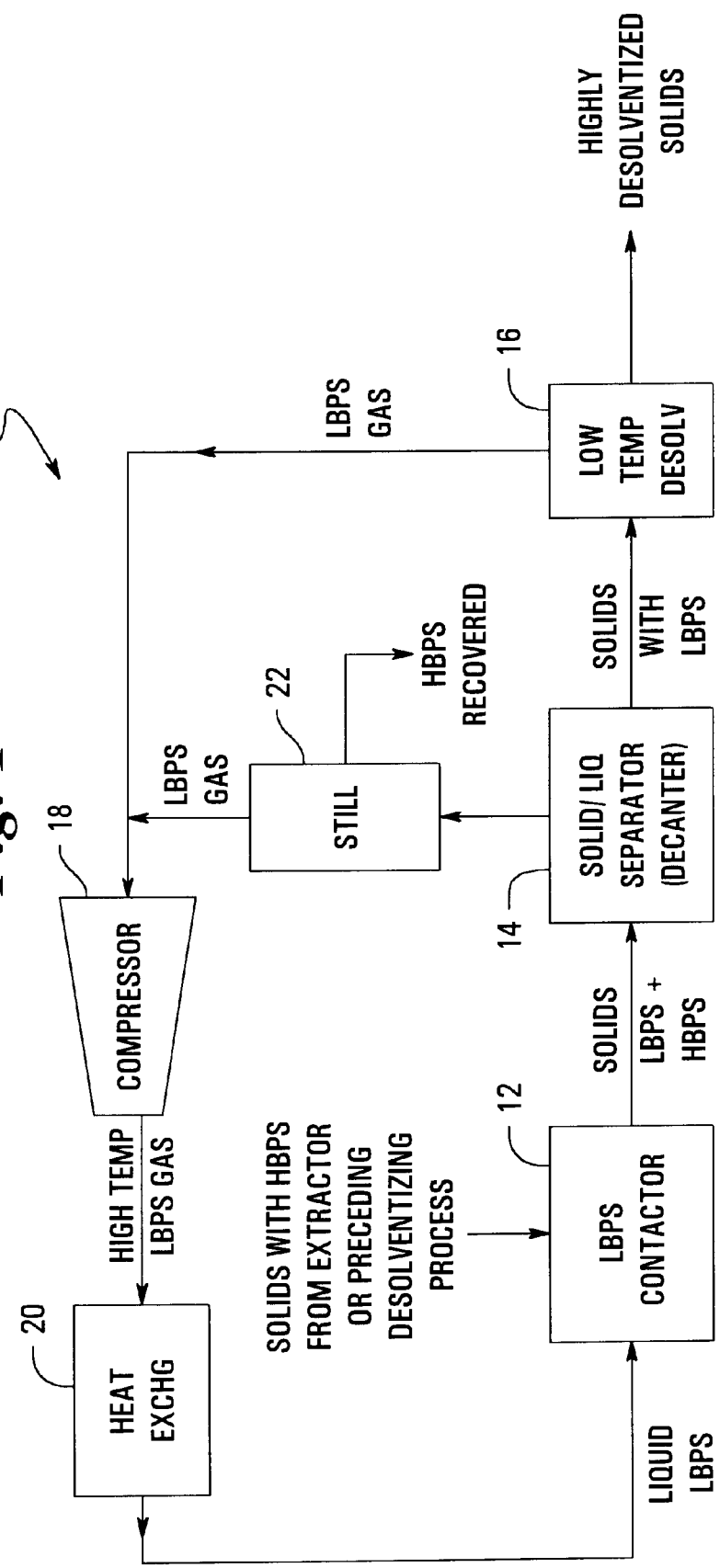
FIG. 1 is a process flow diagram of a preferred process according to the present invention.

Referring to the Drawings, FIG. 1 shows a flow diagram or process description diagram of a preferred system 10 for removing residual solvent according to the present invention. The solvent laden solids, e.g., spent oilseed meal such as soybean meal, are conveyed to an apparatus 12 LBPS contactor filled with a very low molecular weight and boiling point hydrocarbon. For example, n-butane could be used for this purpose, but other low boiling point hydrocarbons such as propane or pentane could alternatively be used.

U.S. Pat. No. 4,496,599 discloses sequential extraction for removal of more than one naturally occurring fat or oil in seeds or solids. It does not, however, provide advantages if b to the n-hexane were replaced by ethanol before desolventizing. It would actually take 2.5× more energy to remove an equal amount of ethanol over n-hexane. Two reasons for adding the n-butane or other low boiler solvent are to remove the previously added (not natural) extraction solvent and to desolventize the flakes or solids at a much lower temperature. Ethanol at 1 atm would need to be boiled off the solids at 173 +F. as compared to n-butane which could be boiled off at 31 F. The solvent in the solids, e.g. hexane, mixes with cold (31 degrees F. at atmospheric pressure) butane and becomes diluted.

At temperatures above 31 F. the mixture of hexane and butane begins to boil and the butane is lost, from the liquid, as a vapor. This assumes atmospheric pressure (14.7 psia). If the gas pressure above the mixture were higher, say 20 psia, then the mixture would boil at a higher temperature of 38 F. The pressure at which to operate varies depending on other factors such as ice formation below 31 F. The temperature, 31 F., is only a function of the lower boiler. The temperature of 31 F. would not be effected by pairing the butane with a solvent different than hexane.

There will be no chemical reaction between hexane and butane. They simply dissolve together as they are mixed. It would take a very unusual set of circumstances for either to react with the other. There is a slight chance that a halogenated solvent might react with the right amount of heat and a catalyst with something else, but it would be extremely rare. If this were to happen, it would most likely affect efforts to try to scrub the main solvent from the oilseed.

The liquid mixture is then decanted off the solids, in a "Solid/Liq Separator" 14 by means of a device which could be as simple as a drum being tipped to allow the solvents to flow out while the solids remain behind or as complex as a centrifuge. An extractor known in the art could be used to convey the solids out of the liquid.

The solids issuing from the separator 14 are sent to a device called a "Low Temp Desolv." 16 where the pressure is reduced slightly. It is estimated that the pressure under which separation occurs will be from 10 psia to 14.5 psia and/or the solids are brought up to room temperature.

The butane flashes off leaving the solids free of the butane. The butane vapor is converted back to a liquid by pressurizing and chilling using compressor 18 and heat exchanger 20. If the first mixing of the liquid and solids insufficiently dilutes the solvent, the solids from the first decant can be sent to a second mixing device (not shown) with fresh butane and decanted again. This cycle can be preformed as many times as necessary to dilute out the original solvent. The liquids from the decants can be sent to a flash tank or still 22 where the pressure is slightly reduced and the temperature brought to ambient conditions. An appropriate combination of temperature and pressure will allow the butane to boil. This will cause the original solvent to remain a liquid and the butane to become a vapor. The vapor is recycled, as above by pressuring and chilling in compressor 18 and heat exchanger 20. The liquid butane is then returned to the mixer 12 to function as the diluting solvent for incoming solids/solvent.

While the process described above concentrates on desolventizing of solids directly from the extractor (not shown), it could also be used on solids that have been processed through a DT. The above desolventizing process with the light hydrocarbon might be useful in those settings where the DT has performed poorly with respect to removing the solvent from the solids or if the solvent used is particularly difficult to remove (by traditional methods) from the solids.

New characteristics and advantages of the invention covered by this document have been set forth in the foregoing description. It will be understood, however, that this disclosure is, in many respects, only illustrative. Changes may be made in details, particularly in matters of shape, size and arrangement of parts and components, without exceeding the scope of the invention. The scope of the invention is, of course, defined in the language in which the appended claims are expressed.

What is claimed is:

1. A process for removing residual amounts of a first solvent having a first ambient pressure boiling point from an oilseed meal, the process comprising the following steps:
   (a) selecting a second solvent, which will remain liquid under normal atmospheric pressure during the process, and which has a second ambient pressure boiling point that is lower than the first ambient pressure boiling point;
   (b) mixing the second solvent with the meal containing the first solvent;
   (c) removing most of the liquid solvent mixture from the meal using a decanting process; and
   (d) removing the remaining solvent mixture primarily comprised of the second solvent from the meal using a thermal and vacuum process, leaving a highly desolventized oilseed meal.

2. The process according to claim 1, further comprising the following steps:
   (e) distilling the first liquid solvent mixture from the extraction process of step (c) to recover liquid original solvent and gaseous second solvent;
   (f) compressing the gaseous second solvent from steps (e) and (d);
   (g) chilling the second solvent, to form a liquid second solvent; and
   (h) repeating step (b) to again mix the second solvent with the meal containing the first solvent.

3. A process for removing residual amounts of a first solvent having a first ambient pressure boiling point from an organic granular solvent material, comprising the steps of:
   (a) selecting a second solvent, which will remain liquid under normal atmospheric pressure during the process, and which has a second ambient pressure boiling point that is lower than the first ambient pressure boiling point;
   (b) mixing the second solvent with the granular material containing the first solvent;
   (c) removing most of the liquid solvent mixture from the granular material using a decanting process; and
   (d) removing the remaining solvent mixture primarily made up of the second solvent from the granular material using a thermal and vacuum process to leave a highly desolventized granular material.

4. A process for removing residual amounts of a first solvent having a first ambient pressure boiling point from an oilseed meal, the process comprising the following steps:
   (a) selecting a second solvent, which will remain liquid during the process under normal atmospheric pressure, and which has a second ambient pressure boiling point that is lower than the first ambient pressure boiling point;
   (b) mixing the second solvent with the meal containing the first solvent;
   (c) removing most of the liquid solvent mixture from the meal using a decanting process; and
   (d) removing the remaining solvent mixture primarily comprised of the second solvent from the meal using a vacuum process, leaving a highly desolventized oilseed meal.

5. A process for removing residual amounts of a first solvent having a first ambient pressure boiling point from an organic granular solvent material, comprising the steps of:
   (a) selecting a second solvent, which will remain liquid during the process during normal atmospheric pressure, and which has a second ambient pressure boiling point that is lower than the first ambient pressure boiling point;
   (b) mixing the second solvent with the granular material containing the first solvent;
   (c) removing most of the liquid solvent mixture from the granular material using a decanting process; and
   (d) removing the remaining solvent mixture primarily made up of the second solvent from the granular material using a vacuum process to leave a highly desolventized granular material.

\* \* \* \* \*